United States Patent
Banerjee

(10) Patent No.: US 9,311,242 B1
(45) Date of Patent: Apr. 12, 2016

(54) SYSTEMS AND METHODS FOR ENABLING WRITE-BACK-CACHE AWARE SNAPSHOT CREATION

(71) Applicant: Symantec Corporation, Mountain View, CA (US)

(72) Inventor: Anindya Banerjee, West Bengal (IN)

(73) Assignee: Symantec Corporation, Mountain View, CA (US)

( * ) Notice: Subject to any disclaimer, the term of this patent is extended or adjusted under 35 U.S.C. 154(b) by 408 days.

(21) Appl. No.: 13/743,904

(22) Filed: Jan. 17, 2013

(51) Int. Cl.
| G06F 12/00 | (2006.01) |
| G06F 13/00 | (2006.01) |
| G06F 13/28 | (2006.01) |
| G06F 12/08 | (2006.01) |
| G06F 3/06 | (2006.01) |
| G06F 11/14 | (2006.01) |

(52) U.S. Cl.
CPC ............ *G06F 12/0815* (2013.01); *G06F 3/065* (2013.01); *G06F 11/1402* (2013.01); *G06F 12/0804* (2013.01)

(58) Field of Classification Search
None
See application file for complete search history.

(56) References Cited

U.S. PATENT DOCUMENTS

| 6,647,473 | B1* | 11/2003 | Golds | G06F 9/445 707/999.202 |
| 7,636,814 | B1* | 12/2009 | Karr et al. | 711/143 |
| 8,612,681 | B2 | 12/2013 | Saito et al. | |
| 2003/0212865 | A1* | 11/2003 | Hicken et al. | 711/135 |
| 2006/0200638 | A1 | 9/2006 | Galipeau et al. | |
| 2006/0265568 | A1* | 11/2006 | Burton | G06F 12/0862 711/216 |
| 2007/0067583 | A1* | 3/2007 | Zohar | G06F 11/1458 711/162 |
| 2010/0077165 | A1* | 3/2010 | Lu et al. | 711/162 |
| 2013/0339569 | A1* | 12/2013 | Yochai et al. | 711/102 |
| 2014/0059298 | A1* | 2/2014 | Olin et al. | 711/135 |

OTHER PUBLICATIONS

Niranjan Pendharkar; Systems and Methods for Enabling Write-Back Caching and Replication at Different Abstraction Layers; U.S. Appl. No. 13/720,871, filed Dec. 19, 2012.

* cited by examiner

*Primary Examiner* — Yaima Rigol
(74) *Attorney, Agent, or Firm* — ALG Intellectual Property, LLC

(57) ABSTRACT

A computer-implemented method for enabling write-back-cache aware snapshot creation may include (1) identifying a cache that implements write-back caching to selectively store at least one write to a backing store, (2) receiving, while the write is stored within the cache, a request to create a snapshot of the backing store, and (3) creating, in response to the request, the snapshot of the backing store by (a) determining that the write is stored within the cache and (b) tracking, in response to the determination, the write stored within the cache to ensure that the write is included in the snapshot of the backing store. Various other methods, systems, and computer-readable media are also disclosed.

20 Claims, 17 Drawing Sheets

SYSTEMS AND METHODS FOR ENABLING WRITE-BACK-CACHE AWARE SNAPSHOT CREATION

BACKGROUND

In the digital age, organizations increasingly rely on digitally stored data. To protect against data loss, organizations may use snapshot technologies to create a point-in-time image of a storage device from which a backup of the storage device may be created. To improve storage system performance, organizations may use caching technologies to cache reads from and/or writes to a relatively slow storage device in faster cache memory.

Unfortunately, attempts to (1) protect against data loss and (2) improve storage system performance by combining common snapshot solutions with common caching solutions may be problematic because certain caching technologies may cause the data stored within a storage device to be point-in-time inconsistent. For example, a typical caching solution may implement a write-back policy to cache writes destined for a storage device. While implementing write-back caching, the caching solution may selectively store some of the writes destined for the storage device to cache memory instead of to the storage device. By selectively storing writes to cache memory instead of to the storage device, the caching solution may cause the data within the storage device to be point-in-time inconsistent. If a snapshot solution is unaware of these writes stored within cache memory, the snapshot solution may create snapshots of the storage device that are also point-in-time inconsistent (e.g. a snapshot of the storage device may not contain all the writes destined for the storage device at the time the snapshot of the storage device is created). For this reason, any backup of the storage device that is created from the data within the snapshot of the storage device may also be point-in-time inconsistent and potentially unusable. Accordingly, the instant disclosure addresses a need for additional and improved systems and methods for enabling write-back-cache aware snapshot creation.

SUMMARY

As will be described in greater detail below, the instant disclosure generally relates to systems and methods for enabling write-back-cache aware snapshot creation by monitoring writes that are destined for a backing store but that have been stored within a cache to ensure that the writes are included in a snapshot of the backing store. In one example, a computer-implemented method for enabling write-back-cache aware snapshot creation may include (1) identifying a cache that implements write-back caching to selectively store at least one write to a backing store, (2) receiving, while the write is stored within the cache, a request to create a snapshot of the backing store, and (3) creating, in response to the request, the snapshot of the backing store by determining that the write is stored within the cache and tracking the write stored within the cache to ensure that the write is included in the snapshot of the backing store.

In some examples, the write to the backing store may be destined for a block of the backing store, and the step of tracking the write stored within the cache may include tracking the block of the backing store to which the write is destined.

In certain examples, the step of creating the snapshot of the backing store may further include (1) detecting a subsequent write to the backing store, (2) determining, in response to the detection, that the subsequent write to the backing store is destined for the block of the backing store, and (3) flushing, in response to the determination that the subsequent write to the backing store is destined for the block of the backing store, the write from the cache to the snapshot of the backing store.

In some examples, the step of tracking the write stored within the cache may include (1) detecting a subsequent request to read from a block of the snapshot, (2) determining that the block of the snapshot is associated with the block of the backing store, and (3) flushing, prior to satisfying the request to read from the block of the snapshot, the write from the cache to the snapshot of the backing store.

In at least one example, the step of tracking the write stored within the cache may include (1) detecting a subsequent request to read from a block of the snapshot, (2) determining that the block of the snapshot is associated with the block of the backing store, and (3) satisfying, while the write is stored within the cache, the request to read from the block of the snapshot with the write stored within the cache.

In some examples, the step of tracking the write stored within the cache may include detecting a request to flush the write from the cache to the backing store, and the step of creating the snapshot of the backing store may further include flushing, in response to the detection, the write from the cache to the snapshot of the backing store.

In another example, the step of tracking the write stored within the cache may include identifying a cache abstraction layer that manages the cache and causing the cache abstraction layer to flush the write from the cache to the snapshot of the backing store. In at least one example, the step of causing the cache abstraction layer to flush the write from the cache to the snapshot of the backing store may include identifying a log used by the cache abstraction layer to manage writes stored within the cache and adding a marker to the log that indicates that the write should be flushed from the cache to the snapshot of the backing store.

In certain examples, the step of creating the snapshot of the backing store may further include providing, in response to the request and while the write is stored within the cache, access to the snapshot of the backing store. In other examples, the step of creating the snapshot of the backing store may further include detecting that the write has been flushed from the cache and providing, in response to the detection, access to the snapshot of the backing store.

In one embodiment, a system for implementing the above-described method may include (1) a cache-identifying module programmed to identify a cache that implements write-back caching to selectively store at least one write to a backing store, (2) a request-receiving module programmed to receive, while the write is stored within the cache, a request to create a snapshot of the backing store, (3) a snapshot-creating module programmed to create, in response to the request, the snapshot of the backing store by determining that the write is stored within the cache and tracking, in response to the determination, the write stored within the cache to ensure that the write is included in the snapshot of the backing store, and (4) at least one processor configured to execute the cache-identifying module, the request-receiving module, and the snapshot-creating module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a cache that implements write-back caching to selectively store at least one write to a backing store, (2) receive, while the write is stored within the cache, a request to create a snapshot of the backing store, and (3) create, in response to the request, the snapshot of the backing store by determining that the write is stored within the cache and tracking, in response to the determination, the write stored within the cache to ensure that the write is included in the snapshot of the backing store.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
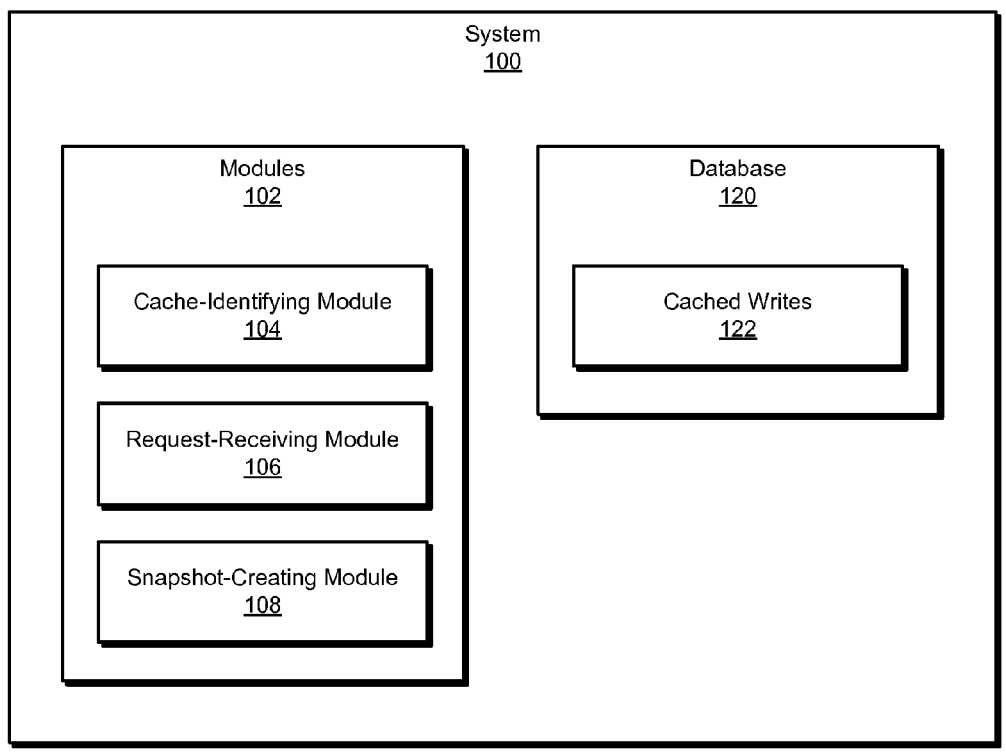
FIG. 1 is a block diagram of an exemplary system for enabling write-back-cache aware snapshot creation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling write-back-cache aware snapshot creation. As will be explained in greater detail below, by (1) identifying writes that are destined for a backing store but that have been held up in a cache when snapshots of the backing store are created and (2) including the cached writes in the snapshots of the backing store, the systems and methods described herein may ensure that the snapshots of the backing store are point-in-time consistent. Furthermore, by tracking cached writes destined for the backing store, these systems and methods may enable snapshots of the backing store to be created in ways that do not require the entire cache to be first flushed.

Figure 2:
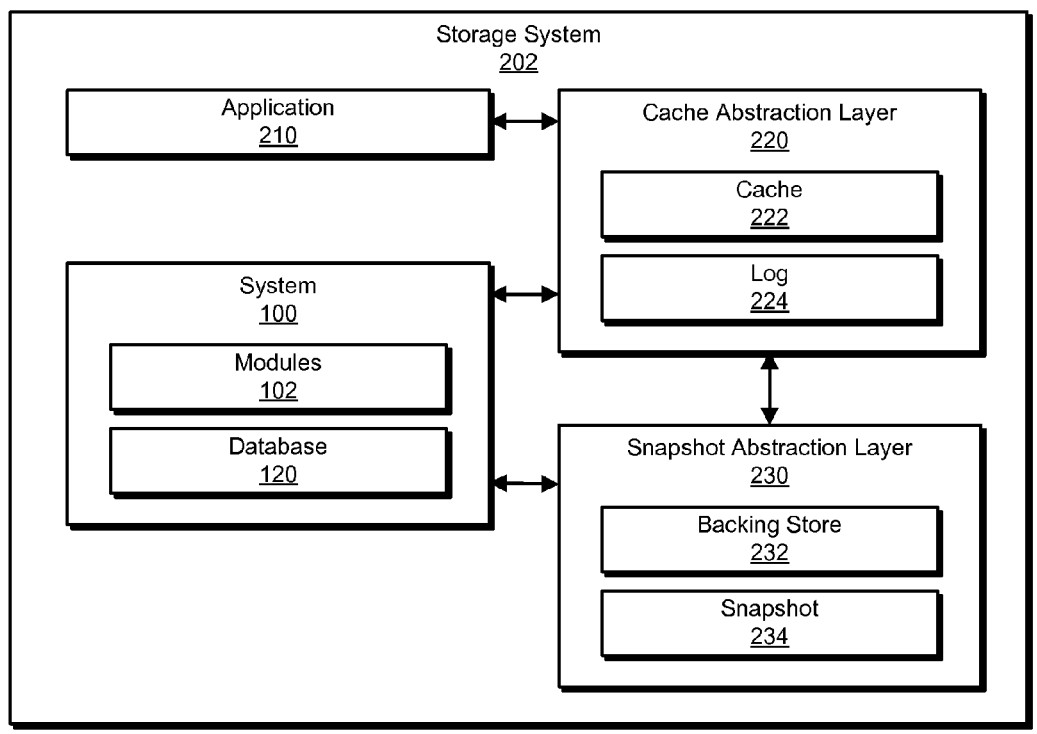
FIG. 2 is a block diagram of an exemplary system for enabling write-back-cache aware snapshot creation.

The following will provide, with reference to FIGS. 1-2, detailed descriptions of exemplary systems for enabling write-back-cache aware snapshot creation. Detailed descriptions of corresponding computer-implemented methods will also be provided in connection with FIGS. 3-15. In addition, detailed descriptions of an exemplary computing system and network architecture capable of implementing one or more of the embodiments described herein will be provided in connection with FIGS. 16 and 17, respectively.

FIG. 1 is a block diagram of an exemplary system 100 for enabling write-back-cache aware snapshot creation. As illustrated in this figure, exemplary system 100 may include one or more modules 102 for performing one or more tasks. For example, and as will be explained in greater detail below, exemplary system 100 may include a cache-identifying module 104 programmed to identify a cache that implements write-back caching to selectively store at least one write to a backing store. Exemplary system 100 may also include a request-receiving module 106 programmed to receive, while the write is stored within the cache, a request to create a snapshot of the backing store.

In addition, and as will be described in greater detail below, exemplary system 100 may include a snapshot-creating module 108 programmed to create the snapshot of the backing store by (1) determining that the write is stored within the cache and (2) tracking the write stored within the cache to ensure that the write is included in the snapshot of the backing store.

Although illustrated as separate elements, one or more of modules 102 in FIG. 1 may represent portions of a single module or application. For example, one or more of modules 102 in FIG. 1 may represent portions of a single module or application that is used to manage a system that includes a cache abstraction layer that implements write-back caching to cache writes to a backing store and a snapshot abstraction layer that creates and maintains snapshots of the backing store. Additionally and/or alternatively, one or more of modules 102 in FIG. 1 may represent portions of a cache abstraction layer and/or a snapshot abstraction layer. As part of the cache abstraction layer and/or the snapshot abstraction layer, one or more of modules 102 in FIG. 1 may enable the cache abstraction layer and the snapshot abstraction layer to coordinate in order to create and maintain write-back-cache aware snapshots of a backing store.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as storage system 202 in FIG. 2, computing system 1610 in FIG. 16, and/or portions of exemplary network architecture 1700 in FIG. 17. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include cached writes 122 for storing information about writes that are destined for a backing store but that are stored within a cache and that are to be included in a snapshot of the backing store. In at least one example, the systems and methods described herein may use cached writes 122 to track writes stored within the cache by tracking the blocks of the backing store to which the writes are destined. For example, cached writes 122 may be used to maintain a list of the blocks of a backing store that have pending writes stored within a cache at the moment when a snapshot of the backing store is created.

Database 120 may represent portions of a single database or computing device or a plurality of databases or computing devices. For example, database 120 may represent a portion of storage system 202 in FIG. 2, computing system 1610 in FIG. 16, and/or portions of exemplary network architecture 1700 in FIG. 17. Alternatively, database 120 in FIG. 1 may represent one or more physically separate devices capable of being accessed by a computing device, such as storage system 202 in FIG. 2, computing system 1610 in FIG. 16, and/or portions of exemplary network architecture 1700 in FIG. 17.

Exemplary system 100 in FIG. 1 may be implemented in a variety of ways. For example, all or a portion of exemplary system 100 may represent portions of exemplary storage system 202 in FIG. 2. As shown in FIG. 2, storage system 202 may include one or more of modules 102 and/or may store all or a portion of the data in database 120. In one embodiment, one or more of modules 102 from FIG. 1 may, when executed by at least one processor of storage system 202, facilitate storage system 202 in enabling write-back-cache aware snapshot creation. For example, and as will be described in greater detail below, one or more of modules 102 may cause storage system 202 to (1) identify cache 222 that implements write-back caching to selectively store at least one write destined for backing store 232, (2) receive, while the write is stored within cache 222, a request to create snapshot 234 of backing store 232, and (3) create, in response to the request, snapshot 234 of backing store 232 by determining that the write is stored within cache 222 and tracking the write to ensure that it is included in snapshot 234.

Storage system 202 generally represents any type or form of computing device capable of reading computer-executable instructions. Examples of storage system 202 include, without limitation, laptops, tablets, desktops, servers, cellular phones, Personal Digital Assistants (PDAs), multimedia players, embedded systems, combinations of one or more of the same, exemplary computing system 1610 in FIG. 16, or any other suitable computing device.

As shown in FIG. 2, storage system 202 may include an application 210 configured to write data to and read data from a backing store 232, a cache abstraction layer 220 configured to implement caching for application 210 (e.g., by storing writes from application 210 destined for backing store 232 in cache 222) without requiring application 210 to be aware of and/or handle any caching operations, and a snapshot abstraction layer 230 configured to create snapshots of backing store 232. As shown, cache abstraction layer 220 may maintain a log 224 (e.g., a sequential log) to track writes stored to cache 222. Cache 222 and backing store 232 may generally represent any type or form of volatile or non-volatile storage device or medium capable of storing data. For example, cache 222 and backing store 232 may represent one or more of the storage mediums and/or storage devices illustrated in FIG. 16 (e.g., system memory 1616, storage device 1632, and/or storage device 1633) and/or one or more of the storage mediums and/or storage devices illustrated in FIG. 17 (e.g., storage devices 1760(1)-(N), storage devices 1770(1)-(N), storage devices 1790(1)-(N), and/or intelligent storage array 1795).

Figure 3:
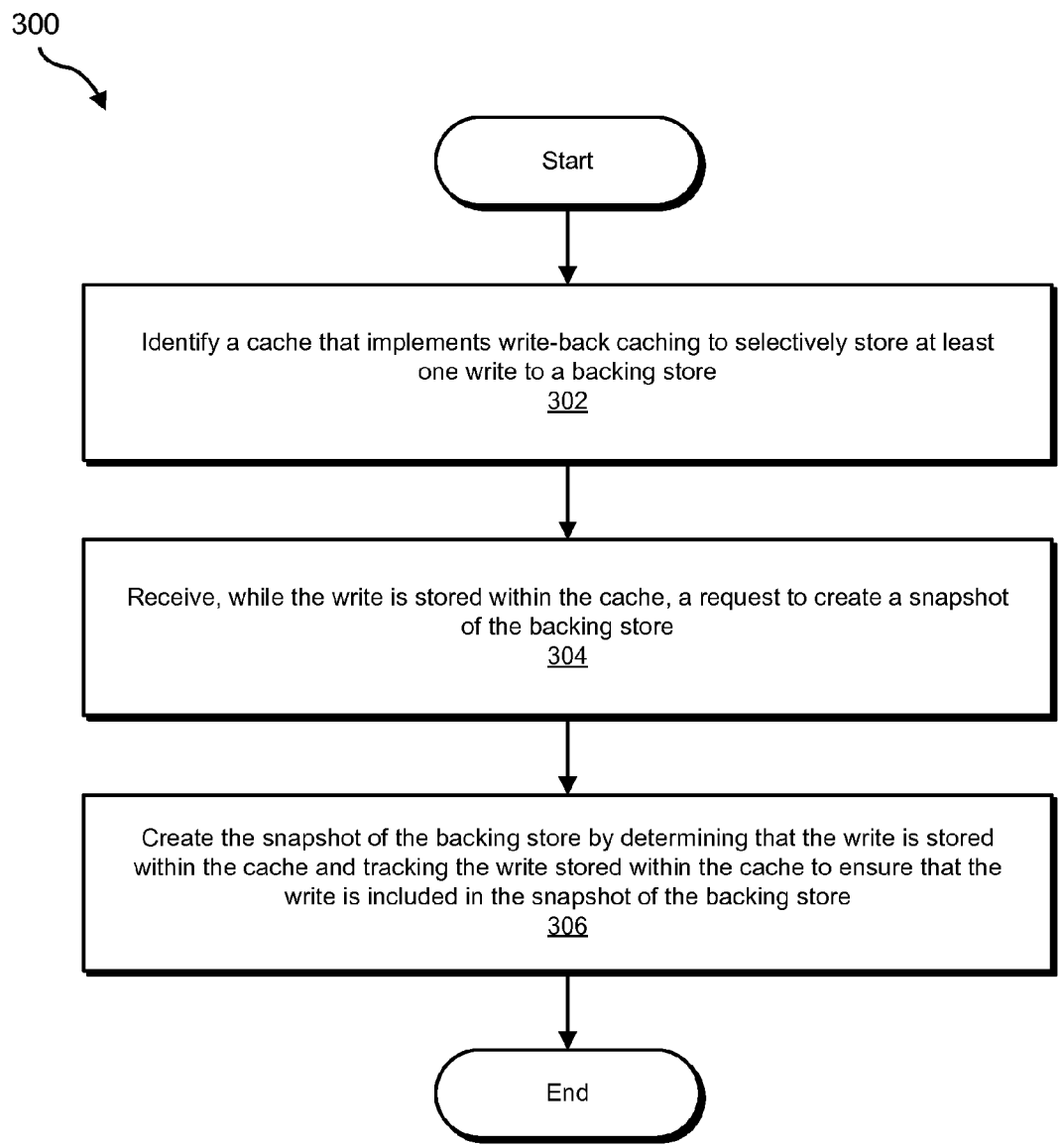
FIG. 3 is a flow diagram of an exemplary method for enabling write-back-cache aware snapshot creation.

FIG. 3 is a flow diagram of an exemplary computer-implemented method 300 for enabling write-back-cache aware snapshot creation. The steps shown in FIG. 3 may be performed by any suitable computer-executable code and/or computing system. In some embodiments, the steps shown in FIG. 3 may be performed by one or more of the components of system 100 in FIG. 1, storage system 202 in FIG. 2, computing system 1610 in FIG. 16, and/or portions of exemplary network architecture 1700 in FIG. 17.

As illustrated in FIG. 3, at step 302 one or more of the systems described herein may identify a cache that implements write-back caching to selectively store at least one write to a backing store. For example, at step 302 cache-identifying module 104 may, as part of storage system 202 in FIG. 2, identify cache 222 that implements write-back caching to selectively store writes destined for backing store 232.

As used herein, the term "cache" may generally refer to a storage device or medium to which a cache abstraction layer stores data. The term "cache abstraction layer", as used herein, may generally refer to any system (e.g., any combination of software and/or hardware) that is capable of caching data destined for a backing store. In some examples, the term "cache abstraction layer" may refer to a system that implements caching for one or more applications without requiring the applications to be aware of and/or handle any caching operations (e.g., allowing the applications to perform I/O operations normally as if no caching were implemented). Examples of cache abstraction layers may include, without limitations, file system managers (e.g., VERITAS FILE SYSTEM) and/or volume managers (e.g., VERITAS VOLUME MANAGER). The term "backing store", as used herein, may generally refer to any type or form of storage device or medium capable of storing data to which one or more applications may write data and/or for which a cache abstraction layer implements caching. Examples of backing stores may include, without limitation, file systems, volumes, and/or storage arrays.

Cache abstraction layers may cache data destined for a backing store using various writing policies. For example, cache abstraction layer 220 may implement write-back caching to cache writes destined for backing store 232. Using a write-back policy, cache abstraction layer 220 may (1) receive, from an application (e.g., application 210), a request to write data to backing store 232 and (2) selectively store a portion of the data to cache 222 but not to backing store 232. Later, before overwriting this data stored to cache 222, cache abstraction layer 220 may flush the data to backing store 232. By selectively storing data to cache 222 but not to backing store 232, cache abstraction layer 220 may cause data within backing store 232 to be, at times, point-in-time inconsistent.

Figure 4:
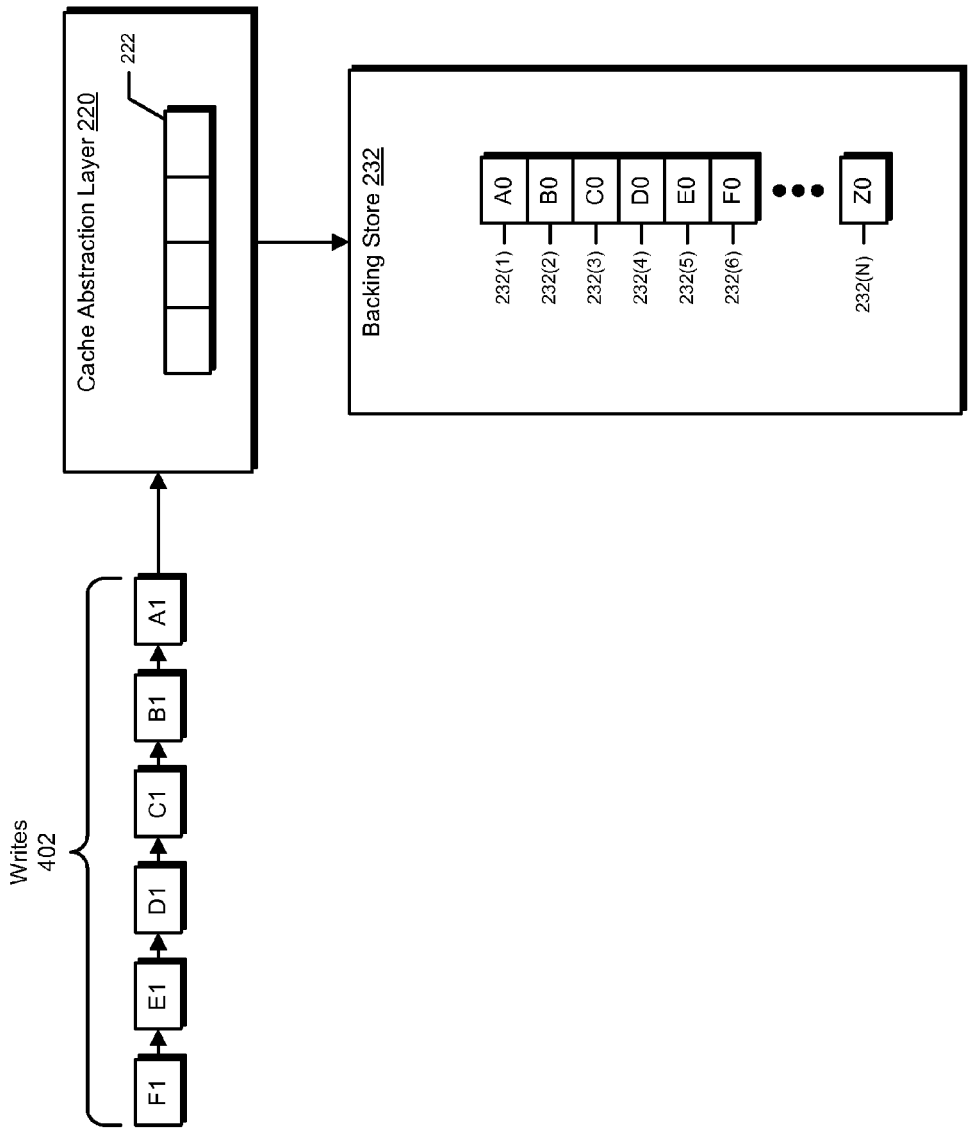
FIG. 4 is a flow diagram of an exemplary data flow for caching data.
Figure 5:
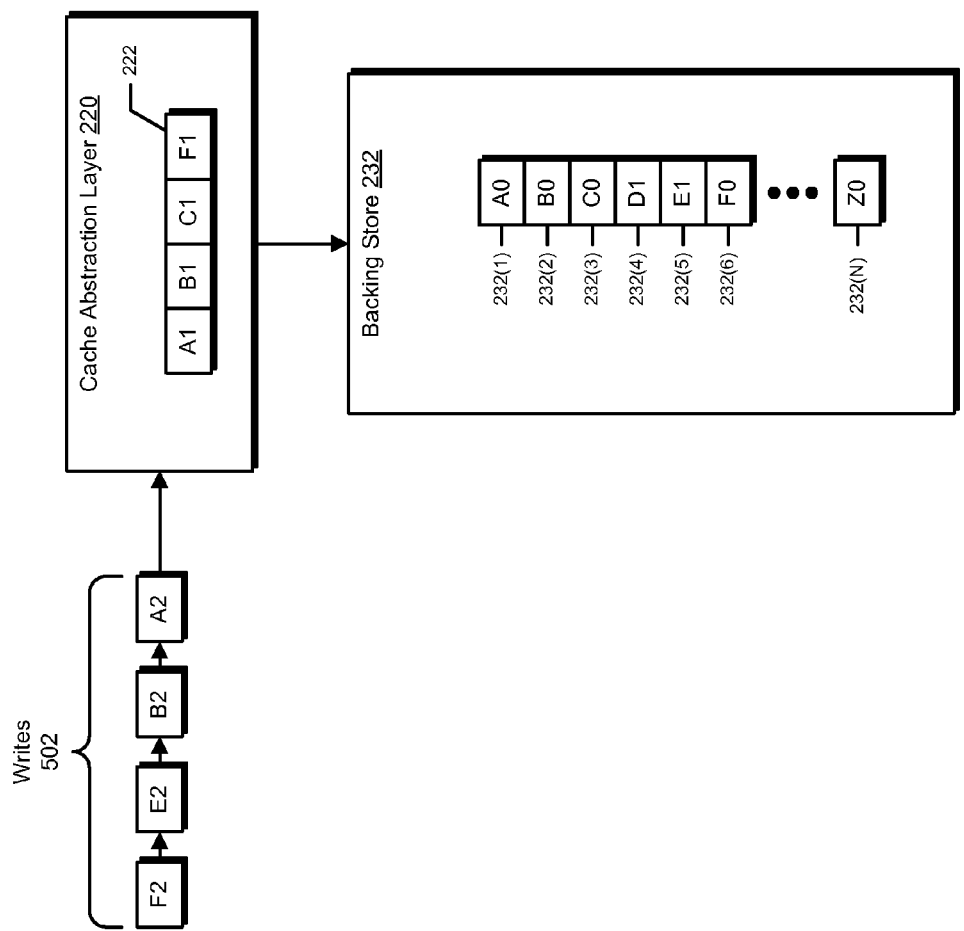
FIG. 5 is a flow diagram of an exemplary data flow for caching data.
Figure 6:
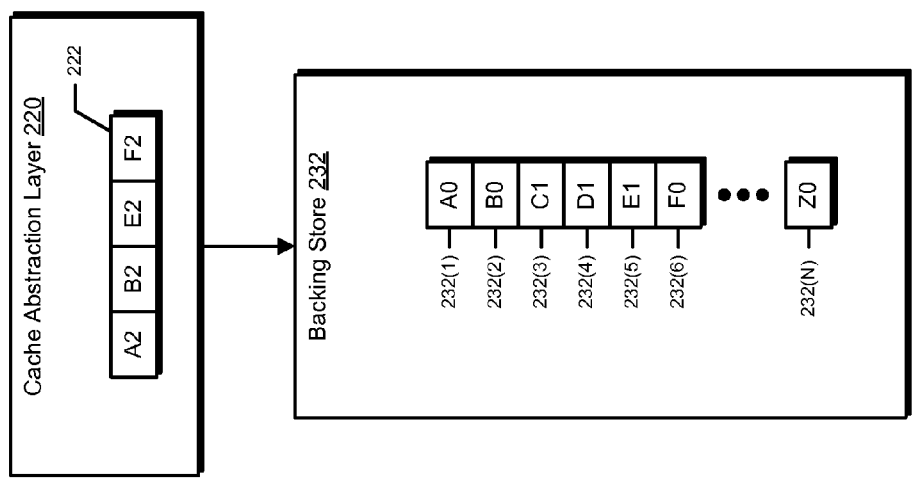
FIG. 6 is a flow diagram of an exemplary data flow for caching data.

FIGS. 4-6 illustrate how cache abstraction layer 220 in FIG. 2 may, while implementing write-back caching, cache a series of writes destined for backing store 232 in a way that causes data within backing store 232 to be point-in-time inconsistent. As shown in FIG. 4, cache abstraction layer 220 may receive a request (e.g., from application 210) to store a series of writes 402 to backing store 232. Writes 402 may include a series of ordered writes A1 destined for block 232 (1), B1 destined for block 232(2), C1 destined for block 232(3), D1 destined for block 232(4), E1 destined for block 232(5), and F1 destined for block 232(6) (e.g., cache abstraction layer 220 may have received a request to store write A1 to backing store 232, followed by a request to store write B1 to backing store 232, etc.). As used herein, the term "block" may refer to a block, sector, cluster, region, file system block, extent, and/or any other suitable unit of a backing store. In response to this request, cache abstraction layer 220 may, again while implementing write-back caching, selectively store some of writes 402 to cache 222 but not to backing store 232 and the rest of writes 402 to backing store 232 but not to cache 222. For example as shown in FIG. 5, cache abstraction layer 220 may store writes A1, B1, C1, and F1 to cache 222 and writes D1 and E1 to backing store 232. Because cache abstraction layer 220 stored some of writes 402 to cache 222 and others to backing store 232, data within backing store 232 may be point-in-time inconsistent.

Cache abstraction layer 220 may continue to receive requests to write data to backing store 232. For example as shown in FIG. 5, cache abstraction layer 220 may receive a request to store an additional series of writes 502 to backing store 232. Writes 502 may include a series of ordered writes A2 destined for block 232(1), B2 destined for block 232(2), E2 destined for block 232(5), and F2 destined for block 232(6). In response to this request, cache abstraction layer 220 may, again while implementing write-back caching, selectively store some of writes 502 to cache 222 but not to backing store 232. For example as shown in FIG. 6, cache abstraction layer 220 may store writes A2, B2, E2, and F2 to cache 222. In this example, cache abstraction layer 220 may flush write C1 from cache 222 to block 232(3) of backing store 232 to make room for write E2.

Because cache abstraction layer 220 stored some of writes 402 and 502 to cache 222 and others to backing store 232, data within backing store 232 may be point-in-time inconsistent. In this example if a snapshot of backing store 232 is created while the data within backing store 232 is point-in-time inconsistent and without taking into account the writes stored within cache 222, the snapshot of backing store 232 may also be point-in-time inconsistent. As explained in greater detail below, the systems and methods described herein may enable the creation of a snapshot of backing store 232 in a way that takes into account the writes stored within cache 222 and that ensures that the snapshot is point-in-time consistent.

As used herein, the term "snapshot" may refer to a consistent point-in-time image of a backing store. In general, a snapshot may represent an exact copy of a backing store at a specific point-in-time (such as the point-in-time at which the snapshot is created) and may be read from and/or written to as such. Examples of snapshots may include, without limitation, volume-level snapshots (e.g., point-in-time images of volumes) and file-level snapshots (e.g., point-in-time images of file systems). In at least one example, the term "snapshot" may refer to a storage checkpoint. Snapshots may be created and maintained by snapshot abstraction layers. As used herein, the term "snapshot abstraction layer", may refer to any system that creates and maintains snapshots of backing stores. Examples of snapshot abstraction layers may include, without limitations, file system managers (e.g., VERITAS FILE SYSTEM), volume managers (e.g., VERITAS VOLUME MANAGER), and/or storage arrays.

Snapshots may be created in a variety of ways. For example, a snapshot of a backing store may include a complete, physically separate copy (e.g., a complete block-for-block copy) of the backing store. In some examples, this type of snapshot may be replicated to a remote secondary storage system. Alternatively, a snapshot of a backing store may include copies of the blocks of the backing store that have been updated since the snapshot was created and references (e.g., a set of pointers and/or a block map) to the blocks of the backing store that have not been updated since the snapshot was created. This latter type of snapshot may be referred to as a copy-on-write or allocate-on-first-write snapshot because space for copies of the blocks of the backing store that have been updated since the snapshot was created may be added to the snapshot only when the blocks are updated for the first time.

Figure 7:
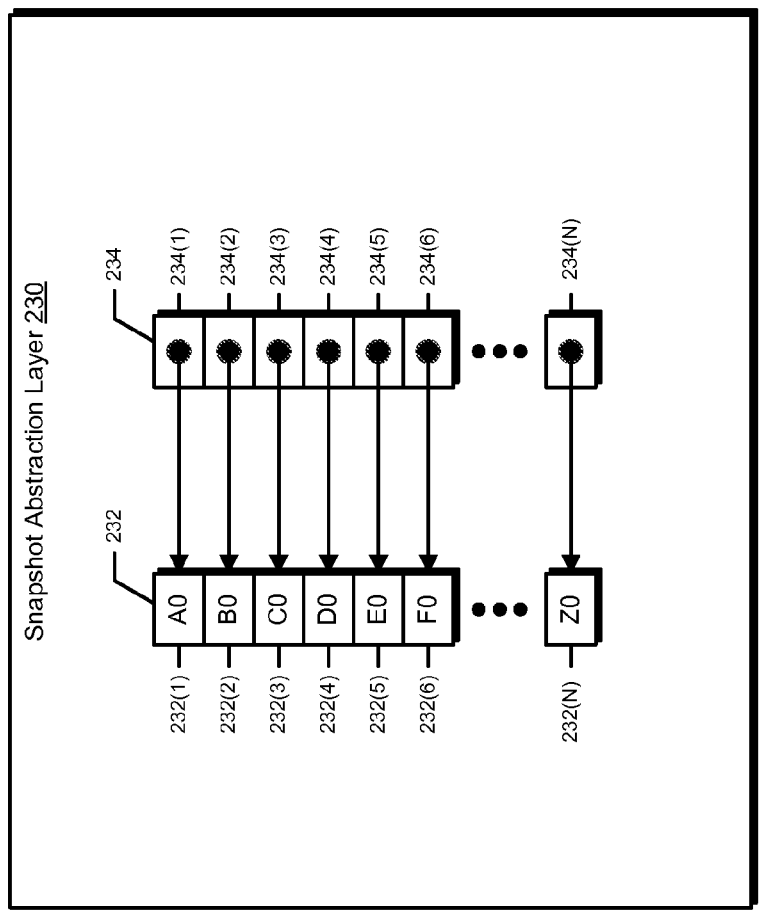
FIG. 7 is a flow diagram of an exemplary data flow for creating a snapshot.
Figure 8:
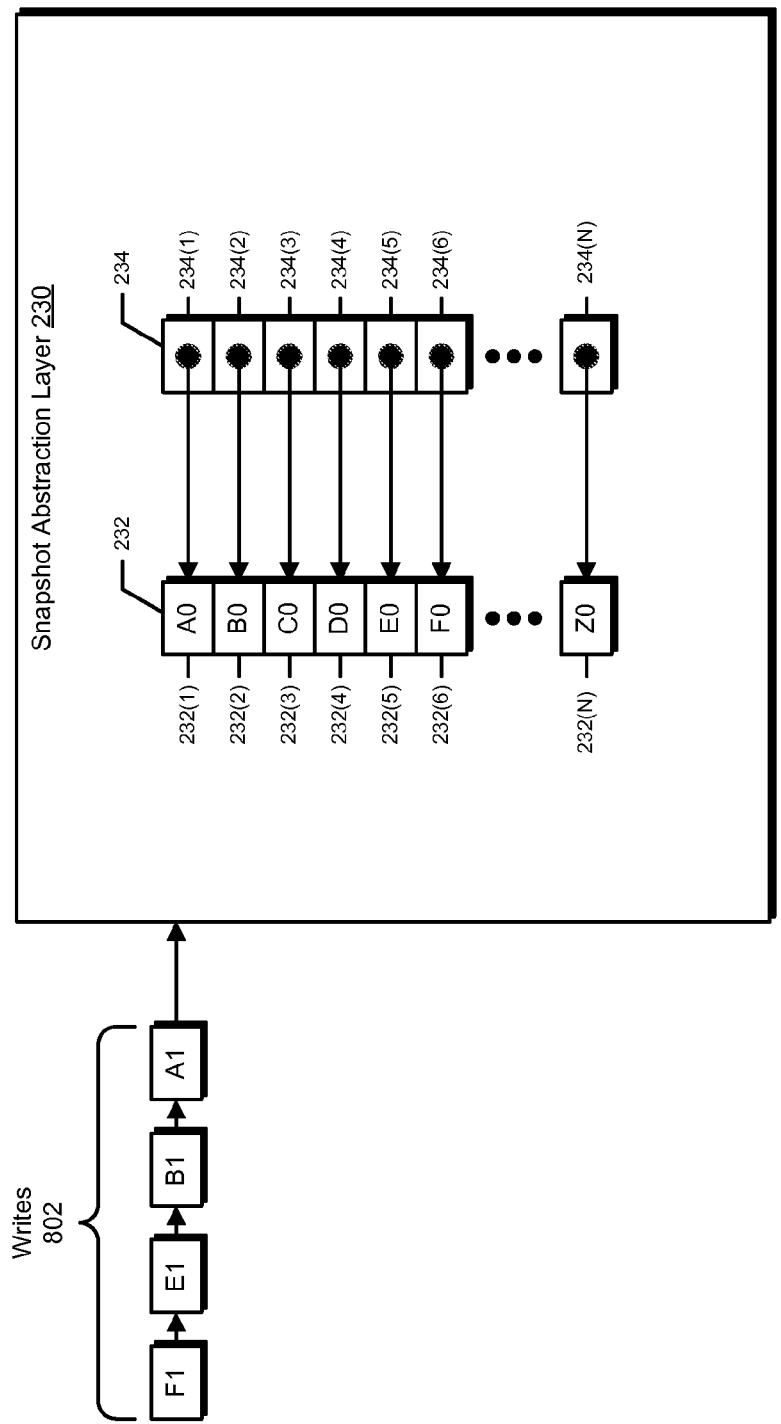
FIG. 8 is a flow diagram of an exemplary data flow for creating a snapshot.
Figure 9:
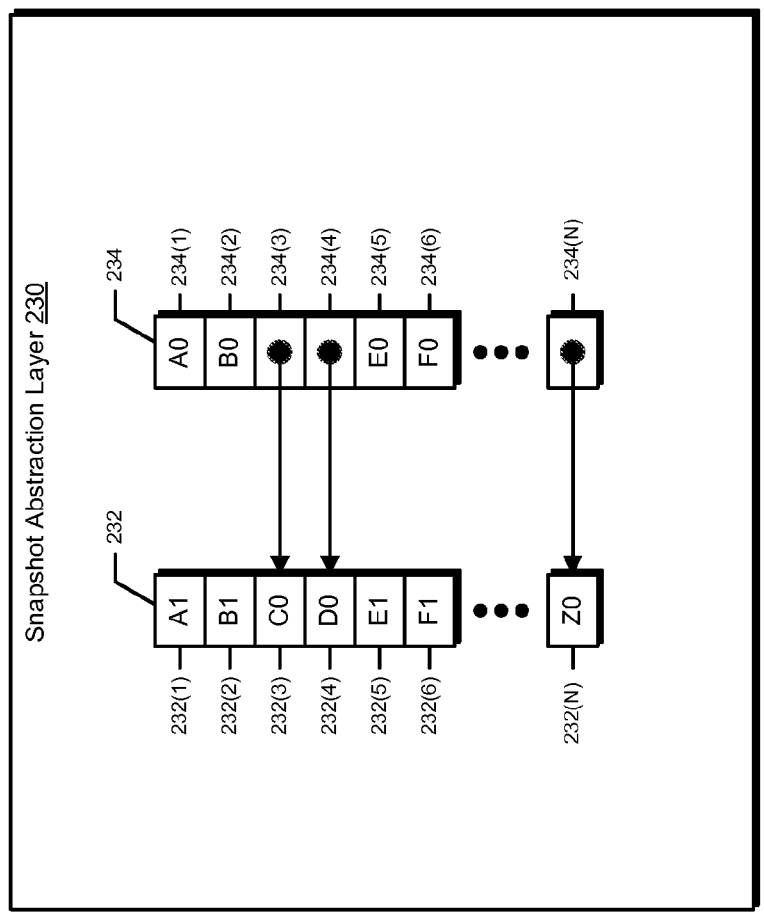
FIG. 9 is a flow diagram of an exemplary data flow for creating a snapshot.

FIGS. 7-9 illustrate how snapshot-creating module 108 may, as part of snapshot abstraction layer 230 and while writes destined for backing store 232 are not cached, create and then maintain snapshot 234 of backing store 232 using a copy-on-write approach. Using a copy-on-write approach, snapshot-creating module 108 may initialize snapshot 234 by creating a set of pointers associated with blocks 234(1)-(N) of snapshot 234 that reference associated blocks of backing store 232. For example, snapshot-creating module 108 may create a pointer that is associated with block 234(1) of snapshot 234 that references block 232(1) of backing store 232. Until block 232(1) of backing store 232 is updated, snapshot-creating module 108 may satisfy requests to read from block 234(1) of snapshot 234 using data stored at block 232(1) of backing store 232.

After snapshot-creating module 108 initializes snapshot 234, data may be written to backing store 232. For example as shown in FIG. 8, snapshot abstraction layer 230 may receive a request (e.g., from application 210) to store a series of writes 802 to backing store 232. Writes 802 may include a series of ordered writes A1 destined for block 232(1), B1 destined for block 232(2), E1 destined for block 232(5), and F1 destined for block 232(6). In response to this request and prior to overwriting the data stored at block 232(1), block 232(2), block 232(5), and block 232(6) (e.g., writes A0, B0, E0, and F0), snapshot abstraction layer 230 may copy this data to snapshot 234 and may update the set of pointers accordingly. For example as shown in FIG. 9, snapshot-creating module 108 may copy write A0 to block 234(1), write B0 to block 234(2), write E0 to block 234(5), and write F1 to block 234(6), after which snapshot-creating module 108 may commit write A1 to block 232(1), write B1 to block 232(2), write E1 to block 232(5), and write F1 to block 232(6).

Returning to FIG. 3, the systems described herein may identify a cache that implements write-back caching to selectively store at least one write to a backing store in any suitable manner. For example, cache-identifying module 104 may represent a portion of a system used to manage cache abstraction layer 220 and snapshot abstraction layer 230 and may identify cache 222 by identifying cache abstraction layer 220 and by detecting that cache abstraction layer 220 caches writes destined for the same backing store from which snapshot abstraction layer 230 creates snapshots. Additionally and/or alternatively, cache-identifying module 104 may identify cache abstraction layer 220 and snapshot abstraction layer 230 by reading a configuration file identifying cache abstraction layer 220 and snapshot abstraction layer 230.

In other examples, cache-identifying module 104 may represent a portion of snapshot abstraction layer 230 and may identify cache 222 by determining that cache abstraction layer 220 is configured to store writes destined for backing store 232 in cache 222.

At step 304, one or more of the systems described herein may receive, while the write is stored within the cache, a request to create a snapshot of the backing store. For example, at step 304 request-receiving module 106 may, as part of storage system 202 in FIG. 2, receive a request to create a snapshot of backing store 232 while writes destined for backing store 232 are stored within cache 222. The systems described herein may perform step 304 in any suitable manner. For example, snapshot abstraction layer 230 may be configured to create snapshots of backing store 232, and request-receiving module 106 may, as part of snapshot abstraction layer 230, receive a request to create snapshot 234 of backing store 232 from a storage system administrator.

At step 306, one or more of the systems described herein may create the snapshot of the backing store by (1) determining that the write is stored within the cache and (2) tracking the write stored within the cache to ensure that the write is included in the snapshot of the backing store. For example, at step 306 snapshot-creating module 108 may, as part of storage system 202 in FIG. 2, create snapshot 234 of backing store 232 by determining that some writes destined for backing store 232 have been stored within cache 222 and tracking these writes to ensure that they are included in snapshot 234. Upon completion of step 306, exemplary method 300 in FIG. 3 may terminate.

The systems described herein may perform step 306 in any suitable manner. In general, snapshot-creating module 108 may ensure that writes destined for backing store 232 but stored within cache 222 are included in snapshot 234 by creating and maintaining snapshot 234 in such a way as to ensure that the writes are accessible via snapshot 234. In some examples, snapshot-creating module 108 may ensure that writes stored within cache 222 when snapshot 234 is create are included in snapshot 234 by simply flushing the writes from cache 222 to backing store 232 before initializing snapshot 234. After flushing the writes from cache 222 to backing store 232, snapshot-creating module 108 may initialize and maintain snapshot 234 using a copy-on-write approach (e.g., the approach described above in connection with FIGS. 7-9).

By flushing writes stored within cache 222 to backing store 232 prior to creating snapshot 234, snapshot-creating module 108 may ensure that these writes are included in snapshot 234 and that snapshot 234 is point-in-time consistent. In at least one example, after flushing the writes stored within cache 222 to backing store 232 and initializing snapshot 234, snapshot-creating module 108 may provide read and/or write access to snapshot 234 of backing store 232. For example, snapshot-creating module 108 may allow a backup application to read from snapshot 234 to create a backup of backing store 232.

Figure 10:
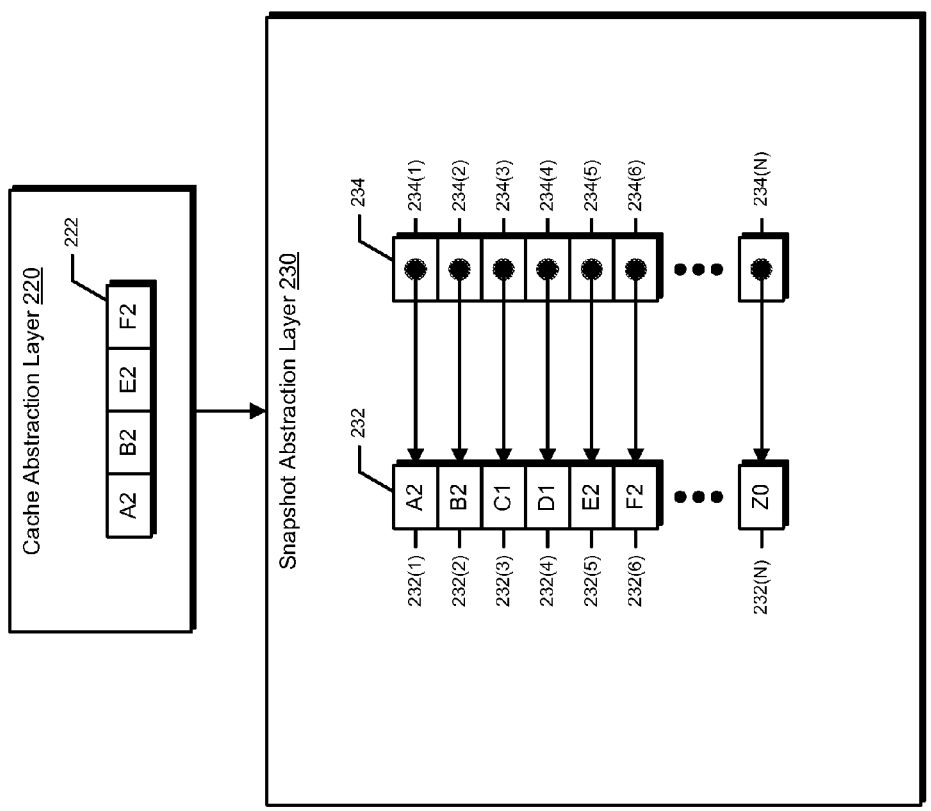
FIG. 10 is a flow diagram of an exemplary data flow for enabling write-back-cache aware snapshot creation.

FIGS. 6 and 10 illustrate how snapshot-creating module 108 may, as part of cache abstraction layer 220 and/or snapshot abstraction layer 230, create snapshot 234 of backing store 232. As explained above, FIG. 6 illustrates the state of cache 222 and backing store 232 after cache abstraction layer 220 has stored writes 502 to cache 222. If request-receiving module 106 receives a request to create a snapshot of backing store 232 at this point, write A2 destined for block 232(1), write B2 destined for block 232(2), write E2 destined for block 232(5), and write F2 destined for block 232(6) are stored within cache 222 and should be included in snapshot 234. For this reason and as shown in FIG. 10, snapshot-creating module 108 may create snapshot 234 of backing store 232 by (1) temporarily freezing write access to cache 222 and backing store 232, (2) flushing write A2 to block 232(1), write B2 to block 232(2), write E2 to block 232(5), and write F2 to block 232(6), and (3) initializing snapshot 234 of backing store 232 using the copy-on-write approach described above in connection with FIGS. 7-9.

Returning to FIG. 3, as an alternative to flushing writes stored within cache 222 to backing store 232 prior to creating snapshot 234, snapshot-creating module 108 may create snapshot 234 using a copy-on-write approach that takes into account the writes stored within cache 222 when snapshot 234 is created. FIGS. 6 and 11-15 provide an example of how snapshot-creating module 108 may create and then maintain snapshot 234 of backing store 232 using a copy-on-write approach by (1) determining which blocks of backing store 232 are up to date when snapshot 234 is created and which blocks of backing store 232 are cached when snapshot 234 is created and (2) ensuring that the data stored to the blocks of backing store 232 that are up to date and the writes stored within cache 222 and that are associated with the blocks of backing store 232 that are cached are included in snapshot 234 (e.g., by ensuring that the data stored to the blocks of backing store 232 that are up to date and the writes stored within cache 222 and that are associated with the blocks of backing store 232 that are cached are copied to snapshot 234 before they are overwritten).

As explained above, FIG. 6 illustrates the state of cache 222 and backing store 232 after cache abstraction layer 220 has stored writes 502 to cache 222. If request-receiving module 106 receives a request to create a snapshot of backing store 232 at this point, write A2 destined for block 232(1), write B2 destined for block 232(2), write E2 destined for block 232(5), and write F2 destined for block 232(6) are stored within cache 222 and should be included in snapshot 234. By (1) temporarily freezing write access to cache 222 and backing store 232 and (2) identifying writes A2, B2, E2, and F2 stored within cache 222, snapshot-creating module 108 may determine that blocks 232(3), 232(4), and 232(N) of backing store 232 are up to date and that blocks 232(1), 232(2), 232(5), and 232(6) have been cached.

Figure 11:
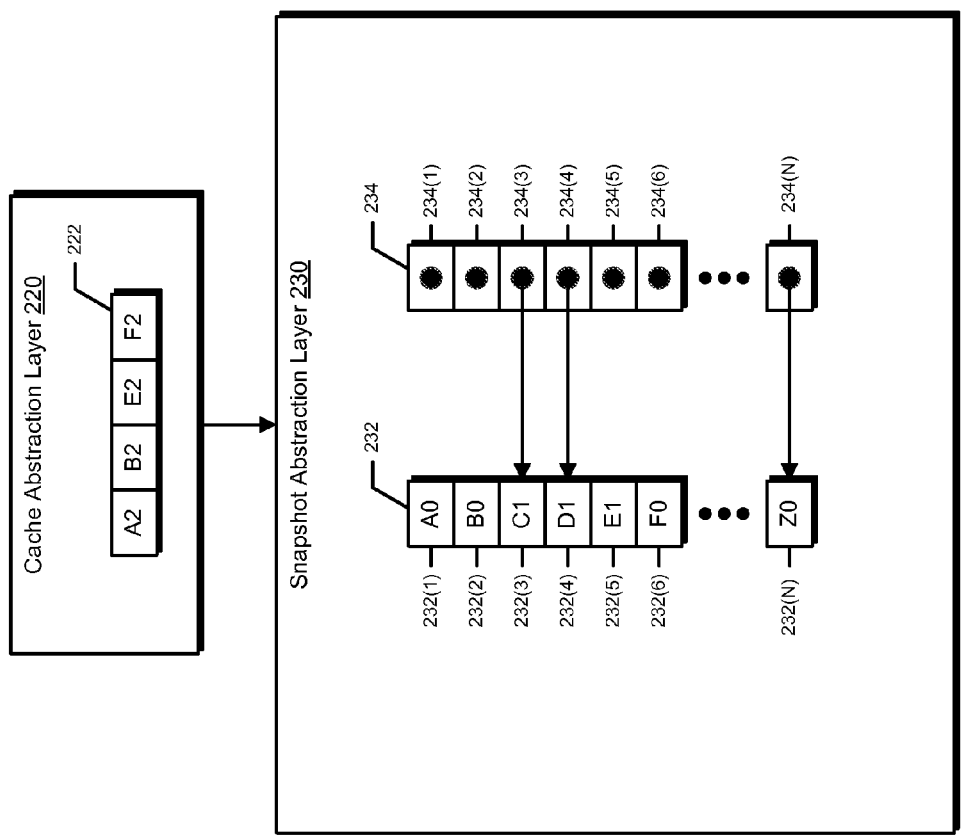
FIG. 11 is a flow diagram of an exemplary data flow for enabling write-back-cache aware snapshot creation.

In some examples, in response to determining which blocks of backing store 232 are up to date, snapshot-creating module 108 may initialize snapshot 234 in a way that ensures that the data stored to the blocks of backing store 232 that are up to date are included in snapshot 234 by (1) associating a set of pointers, that reference the blocks of backing store 232 that are up to date, with the blocks of snapshot 234 that are associated with the blocks of backing store 232 that are up to date and (2) maintaining the set of pointers using the copy-on-write approach described above in connection with FIGS. 7-9. For example as shown in FIG. 11, snapshot-creating module 108 may, in response to a determination that blocks 232(3), 232(4), and 232(N) of backing store 232 are up to date, associate a set of pointers with blocks 234(3), 234(4), and 234(N) of snapshot 234 that reference blocks 232(3), 232(4), and 232(N). In this example, snapshot-creating module 108 may satisfy requests to read from block 234(3), block 234(4), and block 234(N) of snapshot 234 using data stored at block 232(3), block 232(4), and block 232(N) of backing store 232, respectively.

In some examples, in response to determining which blocks of backing store 232 are cached, snapshot-creating module 108 may ensure that the writes stored within cache 222 and that are associated with the blocks of backing store 232 that are cached are included in snapshot 234 by (1) maintaining (e.g., within cached writes 122) a list of cached blocks of backing store 232 that includes the blocks of backing store 232 that are cached and (2) using the list of cached blocks of backing store 232 to ensure that the writes stored within cache 222 and associated with the blocks of backing store 232 that are cached are included in snapshot 234. Using FIG. 11 as an example, in response to determining that blocks 232(1), 232(2), 232(5), and 232(6) have been cached, snapshot-creating module 108 may create a list of cached blocks of backing store 232 that includes blocks 232(1), 232(2), 232(5), and 232(6). In at least one example, snapshot-creating module 108 may use the list of cached blocks to provide read and/or write access to snapshot 234 while writes that should be included in snapshot 234 are stored within cache 222.

Additionally and/or alternatively, in response to determining which blocks of backing store 232 are cached, snapshot-creating module 108 may ensure that the writes stored within cache 222 and that are associated with the blocks of backing store 232 that are cached are included in snapshot 234 by writing a marker to log 224 that identifies which writes stored within cache 222 are to be included in snapshot 234. For example, log 224 may include a sequential log used by cache abstraction layer 220 to track the order in which writes have been stored to cache 222, therefore snapshot-creating module 108 may identify writes stored within cache 222 at the point in time at which snapshot 234 is created by simply writing a marker to log 224 at the point in time at which snapshot 234 is initialized. This marker may indicate that all writes contained within log 224 before the marker should be included in snapshot 234 and that all writes contained within log 224 after the marker should not be included in snapshot 234.

Using FIG. 11 as an example, in response to determining that blocks 232(1), 232(2), 232(5), and 232(6) have been cached, snapshot-creating module 108 may write a marker to log 224 that indicates that write A2 destined for block 232(1), write B2 destined for block 232(2), write E2 destined for block 232(5), and write F2 destined for block 232(6) should be included in snapshot 234 and that prior to being overwritten or flushed these writes should be copied to snapshot 234.

By identifying and tracking the cached blocks of backing store 232 that are cached at the point in time at which snapshot 234 is initialized, snapshot-creating module 108 may, once snapshot 234 has been initiated and while writes that should be included in snapshot 234 are still stored within cache 222, (1) allow write access to cache 222 and backing store 232 and (2) provide read and/or write access to snapshot 234.

In one example, after snapshot 234 has been initialized and write access to cache 222 and backing store 232 has been thawed, cache abstraction layer 220 may receive a request to write data to backing store 232. In response a request to write data to backing store 232, cache abstraction layer 220 may be required to flush writes stored within cache 222 to make room for other writes and/or overwrite writes stored within cache 222. In these situations, snapshot-creating module 108 may, prior to flushing any write stored within cache 222 to backing store 232 or overwriting any write stored within cache 222, determine whether the write should be included in snapshot 234 and, if the write should be included in snapshot 234, flush the write from cache 222 to snapshot 234 and/or backing store 232. For example, snapshot-creating module 108 may, as part of cache abstraction layer 220, use the marker written to log 224 to determine whether to copy a write to snapshot 234 before overwriting the write or flushing the write to backing store 232.

Figure 12:
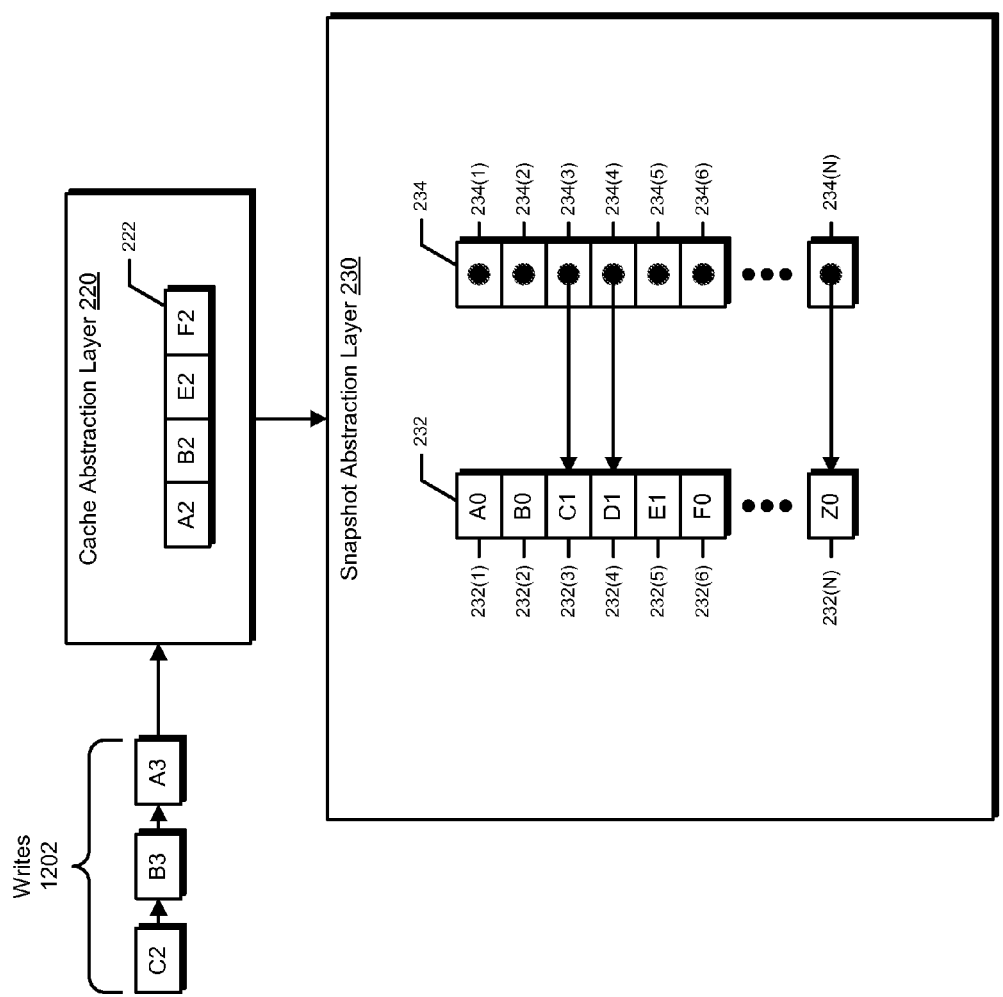
FIG. 12 is a flow diagram of an exemplary data flow for enabling write-back-cache aware snapshot creation.

Using FIG. 12 as an example, cache abstraction layer 220 may receive a request (e.g., from application 210) to store a series of writes 1202 to backing store 232. Writes 1202 may include a series of ordered writes A3 destined for block 232(1), B3 destined for block 232(2), and C2 destined for block 232(3). In response to this request, cache abstraction layer 220 may (1) store writes 1202 to cache 222 but not to backing store 232 by overwriting writes A2 and B2 and flushing write E2 from cache 222 to block 232(5) of backing store 232 to make room for write C2 destined for block 232(3).

Figure 13:
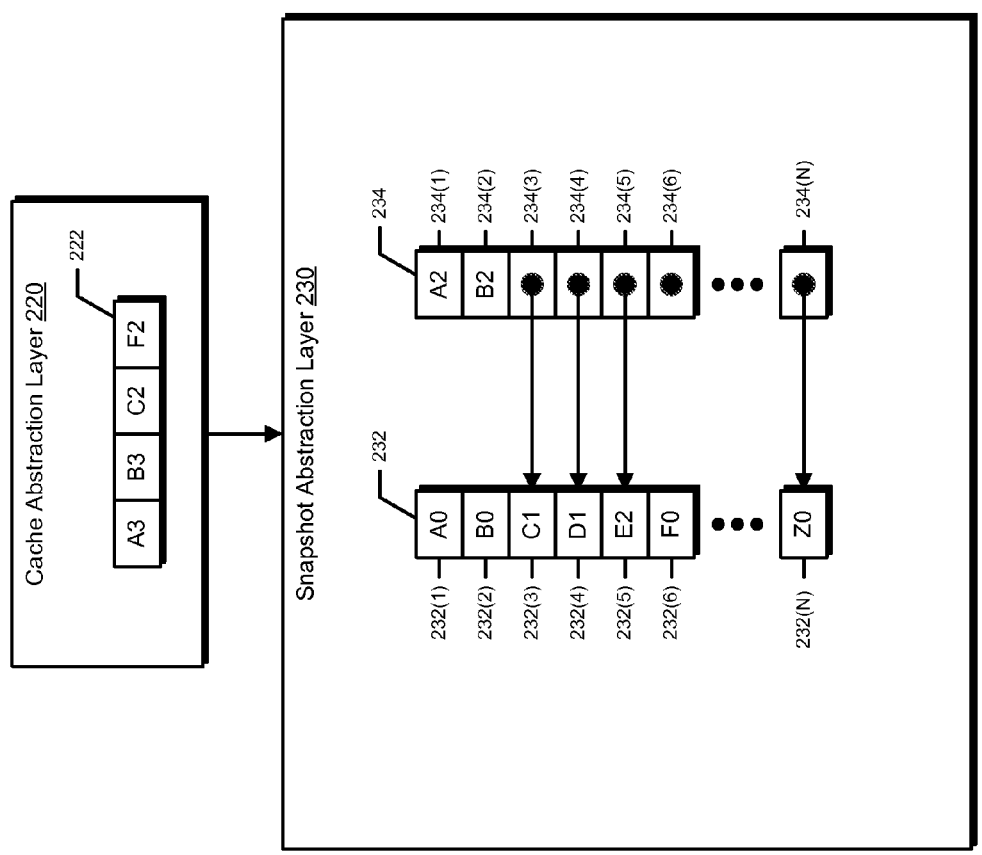
FIG. 13 is a flow diagram of an exemplary data flow for enabling write-back-cache aware snapshot creation.

As shown in FIG. 13 before overwriting writes A2 and B2, snapshot-creating module 108 may, as part of cache abstraction layer 220, use the marker written to log 224 to determine that writes A2 and B2 should be copied to snapshot 234 by determining that writes A2 and B2 are identified in log 224 before the marker was written to log 224. In response to this determination, snapshot-creating module 108 may copy writes A2 and B2 to snapshot 234.

Additionally, before flushing write E2 to backing store 232, snapshot-creating module 108 may determine that write E2 should be included in snapshot 234 by determining that write E2 is identified in log 224 before the marker was written to log 224. In response to this determination and as shown in FIG. 13, snapshot-creating module 108 may flush write E2 to block 232(5) of backing store 232 and may associate a pointer with block 234(5) that references block 232(5). In this example, snapshot-creating module 108 may satisfy subsequent requests to read from block 234(5) using the data stored at block 232(5) of backing store 232.

Figure 14:
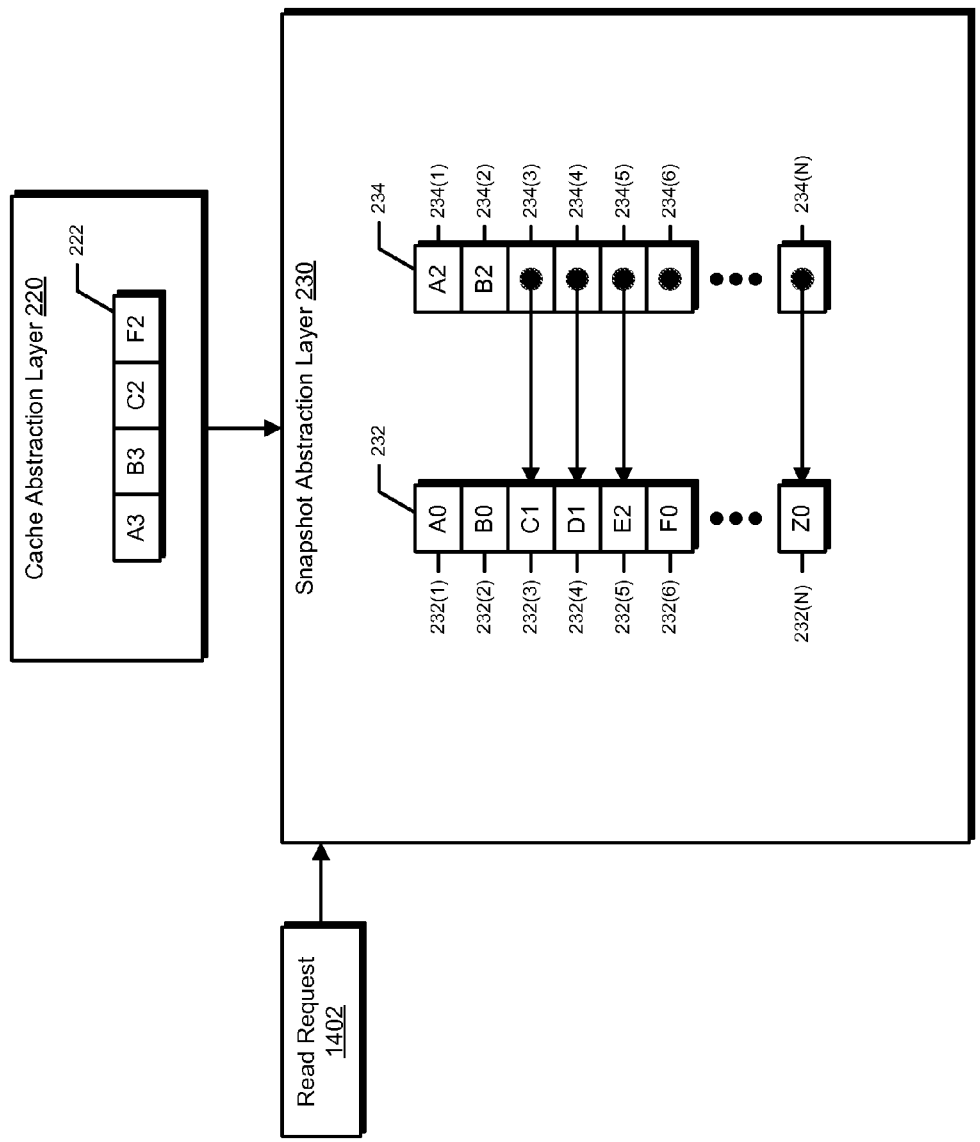
FIG. 14 is a flow diagram of an exemplary data flow for enabling write-back-cache aware snapshot creation.
Figure 15:
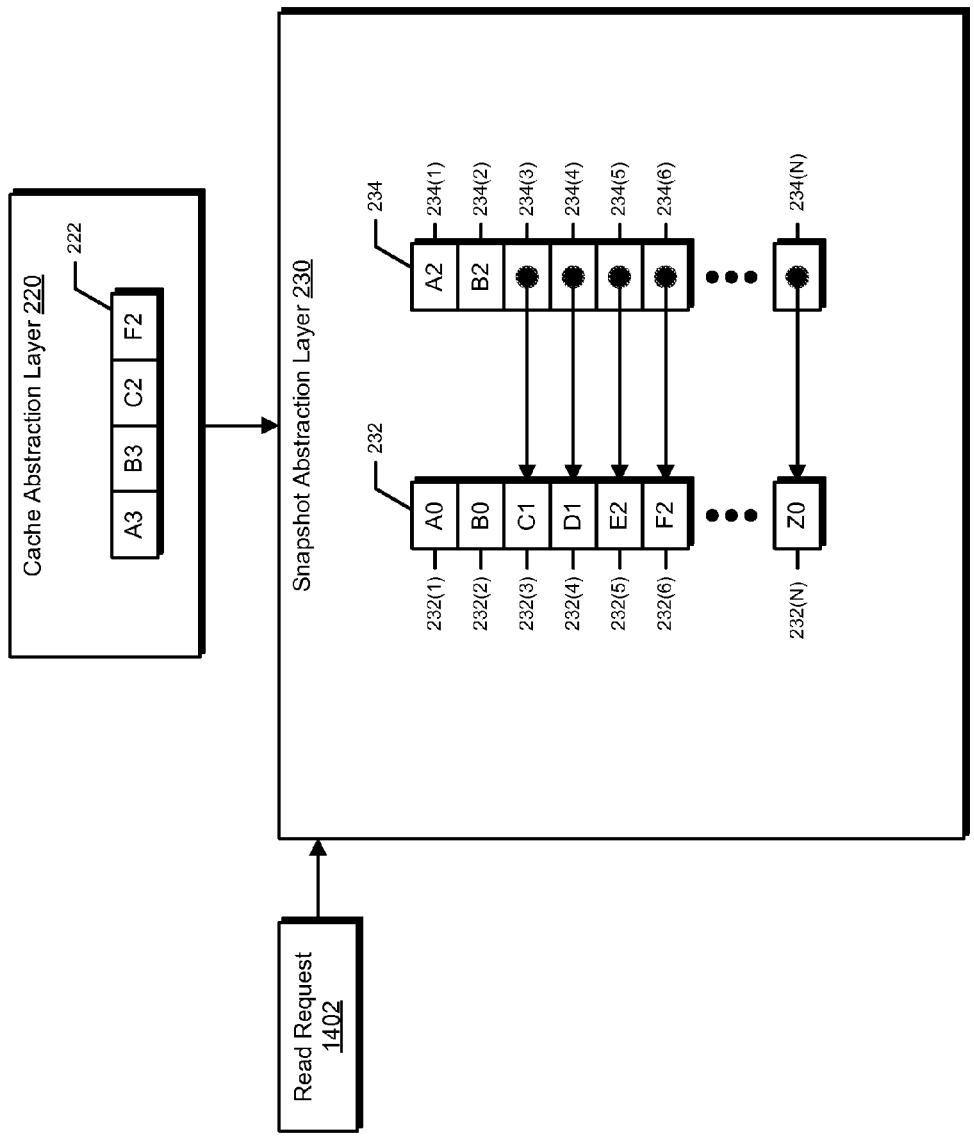
FIG. 15 is a flow diagram of an exemplary data flow for enabling write-back-cache aware snapshot creation.

After snapshot 234 has been initiated and while writes that should be included in snapshot 234 are still stored within cache 222, snapshot-creating module 108 may also receive requests to read from snapshot 234. FIGS. 14 and 15 illustrate how snapshot-creating module 108 may, as part of snapshot abstraction layer 230, respond to a request to read from snapshot 234 while writes that are included in snapshot 234 are stored within cache 222. As shown in FIG. 14 after snapshot 234 has been initialized and writes 1202 have been stored to cache 222, snapshot-creating module 108 may receive a read request 1402 to read data from block 234(6) of snapshot 234. In one example, snapshot-creating module 108 may determine that read request 1402 may be satisfied using data stored within cache 222 by determining that the block of backing store 232 associated with block 234(6) of snapshot 234 is contained within the list of cached blocks stored within cached writes 122. In response to this determination, snapshot-creating module 108 may satisfy read request 1402 by returning write F2 from cache 222.

Alternatively as shown in FIG. 15, snapshot-creating module 108 may respond to read request 1402 to read data from block 234(6) of snapshot 234 by (1) determining that the block of backing store 232 that is associated with block 234 (6) of snapshot 234 is contained within the list of cached blocks stored within cached writes 122, (2) flushing, in response to this determination, write F2 from cache 222 to block 232(6) of backing store 232, and (3) associating a pointer with block 234(6) that references block 232(6). In this example, snapshot-creating module 108 may satisfy read request 1402 and subsequent requests to read from block 234(6) using the data stored at block 232(6) of backing store 232.

As explained above, by (1) identifying writes that are destined for a backing store but that have been held up in a cache when snapshots of the backing store are created and (2) including the cached writes in the snapshots of the backing store, the systems and methods described herein may ensure that the snapshots of the backing store are point-in-time consistent. Furthermore, by tracking cached writes destined for the backing store, these systems and methods may enable snapshots of the backing store to be created in ways that do not require the entire cache to be first flushed. For example, the systems and methods described herein may enable a snapshot solution to create and maintain write-back-cache aware snapshots of file systems and volumes using a copy-on-write approach by (1) detecting when writes destined for the files systems and volumes are cached by a system that implements write-back caching and (2) tracking these writes to ensure that they are copied to the snapshots.

Figure 16:
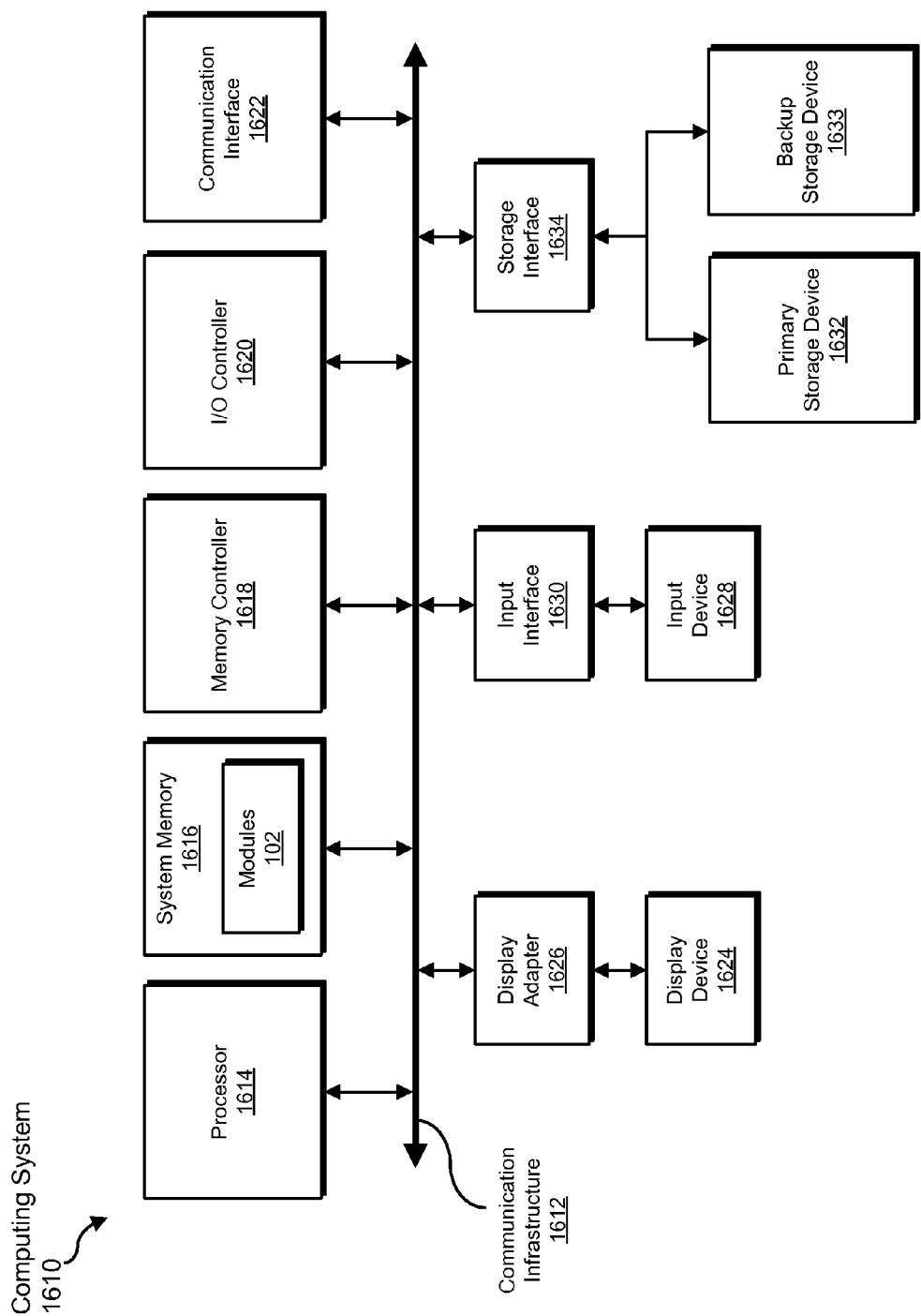
FIG. 16 is a block diagram of an exemplary computing system capable of implementing one or more of the embodiments described and/or illustrated herein.

FIG. 16 is a block diagram of an exemplary computing system 1610 capable of implementing one or more of the embodiments described and/or illustrated herein. For example, all or a portion of computing system 1610 may perform and/or be a means for performing, either alone or in combination with other elements, one or more of the identifying, receiving, creating, determining, tracking, detecting, flushing, satisfying, causing, adding, providing, and enabling steps described herein. All or a portion of computing system 1610 may also perform and/or be a means for performing any other steps, methods, or processes described and/or illustrated herein.

Computing system 1610 broadly represents any single or multi-processor computing device or system capable of executing computer-readable instructions. Examples of computing system 1610 include, without limitation, workstations, laptops, client-side terminals, servers, distributed computing systems, handheld devices, or any other computing system or device. In its most basic configuration, computing system 1610 may include at least one processor 1614 and a system memory 1616.

Processor 1614 generally represents any type or form of processing unit capable of processing data or interpreting and executing instructions. In certain embodiments, processor 1614 may receive instructions from a software application or module. These instructions may cause processor 1614 to perform the functions of one or more of the exemplary embodiments described and/or illustrated herein.

System memory 1616 generally represents any type or form of volatile or non-volatile storage device or medium capable of storing data and/or other computer-readable instructions. Examples of system memory 1616 include, without limitation, Random Access Memory (RAM), Read Only Memory (ROM), flash memory, or any other suitable memory device. Although not required, in certain embodiments computing system 1610 may include both a volatile memory unit (such as, for example, system memory 1616) and a non-volatile storage device (such as, for example, primary storage device 1632, as described in detail below). In one example, one or more of modules 102 from FIG. 1 may be loaded into system memory 1616.

In certain embodiments, exemplary computing system 1610 may also include one or more components or elements in addition to processor 1614 and system memory 1616. For example, as illustrated in FIG. 16, computing system 1610 may include a memory controller 1618, an Input/Output (I/O) controller 1620, and a communication interface 1622, each of which may be interconnected via a communication infrastructure 1612. Communication infrastructure 1612 generally represents any type or form of infrastructure capable of facilitating communication between one or more components of a computing device. Examples of communication infrastructure 1612 include, without limitation, a communication bus (such as an Industry Standard Architecture (ISA), Peripheral Component Interconnect (PCI), PCI Express (PCIe), or similar bus) and a network.

Memory controller 1618 generally represents any type or form of device capable of handling memory or data or controlling communication between one or more components of computing system 1610. For example, in certain embodiments memory controller 1618 may control communication between processor 1614, system memory 1616, and I/O controller 1620 via communication infrastructure 1612.

I/O controller 1620 generally represents any type or form of module capable of coordinating and/or controlling the input and output functions of a computing device. For example, in certain embodiments I/O controller 1620 may control or facilitate transfer of data between one or more elements of computing system 1610, such as processor 1614, system memory 1616, communication interface 1622, display adapter 1626, input interface 1630, and storage interface 1634.

Communication interface 1622 broadly represents any type or form of communication device or adapter capable of facilitating communication between exemplary computing system 1610 and one or more additional devices. For example, in certain embodiments communication interface 1622 may facilitate communication between computing system 1610 and a private or public network including additional computing systems. Examples of communication interface 1622 include, without limitation, a wired network interface (such as a network interface card), a wireless network interface (such as a wireless network interface card), a modem, and any other suitable interface. In at least one embodiment, communication interface 1622 may provide a direct connection to a remote server via a direct link to a network, such as the Internet. Communication interface 1622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1622 may also represent a host adapter configured to facilitate communication between computing system 1610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1622 may also allow computing system 1610 to engage in distributed or remote computing. For example, communication interface 1622 may receive instructions from a remote device or send instructions to a remote device for execution.

As illustrated in FIG. 16, computing system 1610 may also include at least one display device 1624 coupled to communication infrastructure 1612 via a display adapter 1626. Display device 1624 generally represents any type or form of device capable of visually displaying information forwarded by display adapter 1626. Similarly, display adapter 1626 generally represents any type or form of device configured to forward graphics, text, and other data from communication infrastructure 1612 (or from a frame buffer, as known in the art) for display on display device 1624.

As illustrated in FIG. 16, exemplary computing system 1610 may also include at least one input device 1628 coupled to communication infrastructure 1612 via an input interface 1630. Input device 1628 generally represents any type or form of input device capable of providing input, either computer or human generated, to exemplary computing system 1610. Examples of input device 1628 include, without limitation, a keyboard, a pointing device, a speech recognition device, or any other input device.

As illustrated in FIG. 16, exemplary computing system 1610 may also include a primary storage device 1632 and a backup storage device 1633 coupled to communication infrastructure 1612 via a storage interface 1634. Storage devices 1632 and 1633 generally represent any type or form of storage device or medium capable of storing data and/or other computer-readable instructions. For example, storage devices 1632 and 1633 may be a magnetic disk drive (e.g., a so-called hard drive), a solid state drive, a floppy disk drive, a magnetic tape drive, an optical disk drive, a flash drive, or the like. Storage interface 1634 generally represents any type or form of interface or device for transferring data between storage devices 1632 and 1633 and other components of computing system 1610. In one example, database 120 from FIG. 1 may be stored in primary storage device 1632.

In certain embodiments, storage devices 1632 and 1633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1632 and 1633 may also include other similar structures or devices for allowing computer software, data, or other computer-readable instructions to be loaded into computing system 1610. For example, storage devices 1632 and 1633 may be configured to read and write software, data, or other computer-readable information. Storage devices 1632 and 1633 may also be a part of computing system 1610 or may be a separate device accessed through other interface systems.

Many other devices or subsystems may be connected to computing system 1610. Conversely, all of the components and devices illustrated in FIG. 16 need not be present to practice the embodiments described and/or illustrated herein. The devices and subsystems referenced above may also be interconnected in different ways from that shown in FIG. 16. Computing system 1610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1610. All or a portion of the computer program stored on the computer-readable-storage medium may then be stored in system memory 1616 and/or various portions of storage devices 1632 and 1633. When executed by processor 1614, a computer program loaded into computing system 1610 may cause processor 1614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1610 may be configured as an Application Specific Integrated Circuit (ASIC) adapted to implement one or more of the exemplary embodiments disclosed herein.

Figure 17:
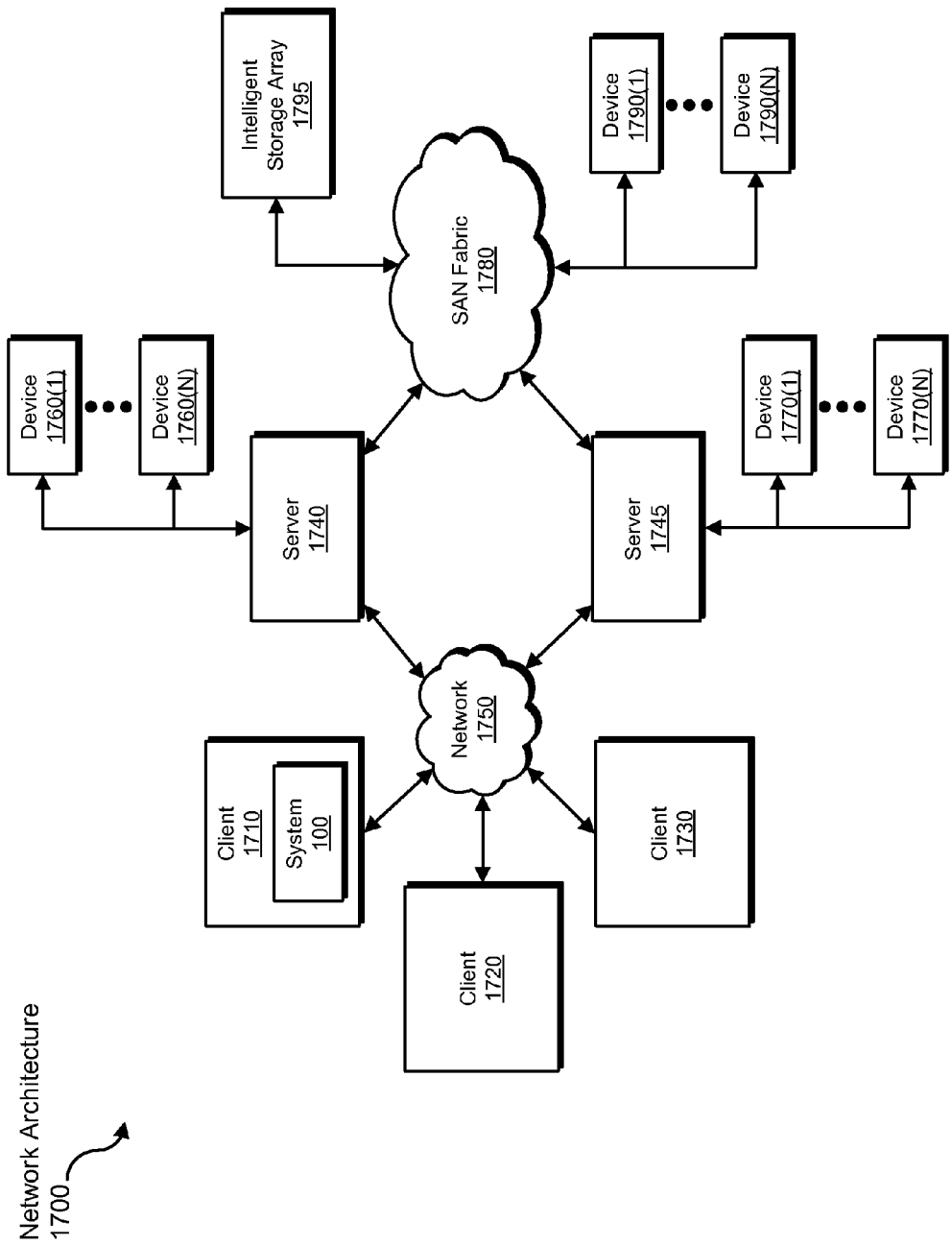
FIG. 17 is a block diagram of an exemplary computing network capable of implementing one or more of the embodiments described and/or illustrated herein.

FIG. 17 is a block diagram of an exemplary network architecture 1700 in which client systems 1710, 1720, and 1730 and servers 1740 and 1745 may be coupled to a network 1750. As detailed above, all or a portion of network architecture 1700 may perform and/or be a means for performing, either alone or in combination with other elements, one or more of the identifying, receiving, creating, determining, tracking, detecting, flushing, satisfying, causing, adding, providing, and enabling steps disclosed herein. All or a portion of network architecture 1700 may also be used to perform and/or be a means for performing other steps and features set forth in the instant disclosure.

Client systems 1710, 1720, and 1730 generally represent any type or form of computing device or system, such as exemplary computing system 1610 in FIG. 16. Similarly, servers 1740 and 1745 generally represent computing devices or systems, such as application servers or database servers, configured to provide various database services and/or run certain software applications. Network 1750 generally represents any telecommunication or computer network including, for example, an intranet, a WAN, a LAN, a PAN, or the Internet. In one example, client systems 1710, 1720, and/or 1730 and/or servers 1740 and/or 1745 may include all or a portion of system 100 from FIG. 1.

As illustrated in FIG. 17, one or more storage devices 1760(1)-(N) may be directly attached to server 1740. Similarly, one or more storage devices 1770(1)-(N) may be directly attached to server 1745. Storage devices 1760(1)-(N) and storage devices 1770(1)-(N) generally represent any type or form of storage device or medium capable of storing data and/or other computer-readable instructions. In certain embodiments, storage devices 1760(1)-(N) and storage devices 1770(1)-(N) may represent Network-Attached Storage (NAS) devices configured to communicate with servers 1740 and 1745 using various protocols, such as Network File System (NFS), Server Message Block (SMB), or Common Internet File System (CIFS).

Servers 1740 and 1745 may also be connected to a Storage Area Network (SAN) fabric 1780. SAN fabric 1780 generally represents any type or form of computer network or architecture capable of facilitating communication between a plurality of storage devices. SAN fabric 1780 may facilitate communication between servers 1740 and 1745 and a plurality of storage devices 1790(1)-(N) and/or an intelligent storage array 1795. SAN fabric 1780 may also facilitate, via network 1750 and servers 1740 and 1745, communication between client systems 1710, 1720, and 1730 and storage devices 1790(1)-(N) and/or intelligent storage array 1795 in such a manner that devices 1790(1)-(N) and array 1795 appear as locally attached devices to client systems 1710, 1720, and 1730. As with storage devices 1760(1)-(N) and storage devices 1770(1)-(N), storage devices 1790(1)-(N) and intelligent storage array 1795 generally represent any type or form of storage device or medium capable of storing data and/or other computer-readable instructions.

In certain embodiments, and with reference to exemplary computing system 1610 of FIG. 16, a communication interface, such as communication interface 1622 in FIG. 16, may be used to provide connectivity between each client system 1710, 1720, and 1730 and network 1750. Client systems 1710, 1720, and 1730 may be able to access information on server 1740 or 1745 using, for example, a web browser or other client software. Such software may allow client systems 1710, 1720, and 1730 to access data hosted by server 1740, server 1745, storage devices 1760(1)-(N), storage devices 1770(1)-(N), storage devices 1790(1)-(N), or intelligent storage array 1795. Although FIG. 17 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1740, server 1745, storage devices 1760(1)-(N), storage devices 1770(1)-(N), storage devices 1790(1)-(N), intelligent storage array 1795, or any combination thereof. All or a portion of one or more of the exemplary embodiments disclosed herein may also be encoded as a computer program, stored in server 1740, run by server 1745, and distributed to client systems 1710, 1720, and 1730 over network 1750.

As detailed above, computing system 1610 and/or one or more components of network architecture 1700 may perform and/or be a means for performing, either alone or in combination with other elements, one or more steps of an exemplary method for enabling write-back-cache aware snapshot creation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may determine that a backing store has been made point-in-time inconsistent as a result of certain writes destined for the backing store having been stored to a cache that implements write-back caching, transform the data stored within the inconsistent backing store and the writes destined for the backing store that have been stored to the cache into a consistent snapshot of the backing store (e.g., by ensuring that the writes destined for the backing store that have been stored to the cache are included in the snapshot of the backing store), output a result of the transformation as a consistent snapshot of the backing store, use the result of the transformation to create a backup of the backing store, and store the result of the transformation to a secondary storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling write-back-cache aware snapshot creation, at least a portion of the method being performed by a computing device comprising at least one processor, the method comprising:
   identifying a cache that implements write-back caching to selectively store at least one write to a backing store;
   receiving, while the write is stored within the cache, a request to create a snapshot of the backing store, where the write is to be included in the snapshot of the backing store;
   creating, in response to the request and while the write is still stored within the cache, the snapshot of the backing store by:
      determining that the write is stored within the cache;
      tracking the write while the write is still stored within the cache and while the snapshot is accessible to ensure that the write is included in the snapshot of the backing store;
   providing read access to the snapshot without first flushing the write to the backing store by receiving, while the write is stored within the cache, a request to read from the snapshot;
   satisfying the request to read from the snapshot.

2. The method of claim 1, wherein:
   the write to the backing store is destined for a block of the backing store;
   tracking the write while the write is still stored within the cache comprises tracking the block of the backing store to which the write is destined.

3. The method of claim 2, wherein providing read access to the snapshot without first flushing the write to the backing store further comprises:
   detecting a subsequent write to the backing store;
   determining, in response to the detection, that the subsequent write to the backing store is destined for the block of the backing store;
   flushing, in response to the determination that the subsequent write to the backing store is destined for the block of the backing store, the write from the cache to the snapshot of the backing store.

4. The method of claim 2, wherein providing read access to the snapshot without first flushing the write to the backing store comprises:
   detecting a subsequent request to read from a block of the snapshot;
   determining that the block of the snapshot is associated with the block of the backing store;
   flushing, prior to satisfying the request to read from the block of the snapshot, the write from the cache to the snapshot of the backing store.

5. The method of claim 2, wherein providing read access to the snapshot without first flushing the write to the backing store comprises:
   detecting a subsequent request to read from a block of the snapshot;
   determining that the block of the snapshot is associated with the block of the backing store;
   satisfying, while the write is stored within the cache, the request to read from the block of the snapshot with the write stored within the cache.

6. The method of claim 1, wherein:
   tracking the write while the write is still stored within the cache comprises detecting a request to flush the write from the cache to the backing store;
   providing read access to the snapshot without first flushing the write to the backing store further comprises flushing, in response to the detection, the write from the cache to the snapshot of the backing store.

7. The method of claim 1, wherein tracking the write while the write is still stored within the cache comprises:
   identifying a cache abstraction layer that manages the cache;
   causing the cache abstraction layer to flush the write from the cache to the snapshot of the backing store.

8. The method of claim 7, wherein causing the cache abstraction layer to flush the write from the cache to the snapshot of the backing store comprises:
   identifying a log used by the cache abstraction layer to manage writes stored within the cache;
   adding a marker to the log that indicates that the write should be flushed from the cache to the snapshot of the backing store.

9. The method of claim 1, wherein:
   the write to the backing store is destined for a block of the backing store;
   tracking the write while the write is still stored within the cache comprises:
      maintaining a list of cached blocks of the backing store that includes blocks of the backing store that are cached; and
      using the list of cached blocks of the backing store to ensure that the writes stored within the cache and associated with the blocks of the backing store that are cached are included in the snapshot of the backing store.

10. The method of claim 9, wherein tracking the write while the write is still stored within the cache further comprises:
    detecting that the write is no longer stored within the cache;
    updating the list of cached blocks of the backing store to reflect that the write is no longer stored within the cache.

11. A system for enabling write-back-cache aware snapshot creation, the system comprising:
    a cache-identifying module programmed to identify a cache that implements write-back caching to selectively store at least one write to a backing store;
    a request-receiving module programmed to receive, while the write is stored within the cache, a request to create a snapshot of the backing store, where the write is to be included in the snapshot of the backing store;
    a snapshot-creating module programmed to:
       create, in response to the request and while the write is still stored within the cache, the snapshot of the backing store by:
          determining that the write is stored within the cache;
          tracking, the write while the write is still stored within the cache and while the snapshot is accessible to ensure that the write is included in the snapshot of the backing store;
       provide read access to the snapshot without first flushing the write to the backing store by receiving, while the write is stored within the cache, a request to read from the snapshot;
       satisfy the request to read from the snapshot;
    at least one processor configured to execute the cache-identifying module, the request-receiving module, and the snapshot-creating module.

12. The system of claim 11, wherein:
the write to the backing store is destined for a block of the backing store;
the snapshot-creating module is programmed to track the write stored within the cache by tracking the block of the backing store to which the write is destined.

13. The system of claim 12, wherein the snapshot-creating module is further programmed to provide read access to the snapshot without first flushing the write to the backing store by:
detecting a subsequent write to the backing store;
determining, in response to the detection, that the subsequent write to the backing store is destined for the block of the backing store;
flushing, in response to the determination that the subsequent write to the backing store is destined for the block of the backing store, the write from the cache to the snapshot of the backing store.

14. The system of claim 12, wherein the snapshot-creating module is programmed to provide read access to the snapshot without first flushing the write to the backing store by:
detecting a subsequent request to read from a block of the snapshot;
determining that the block of the snapshot is associated with the block of the backing store;
flushing, prior to satisfying the request to read from the block of the snapshot, the write from the cache to the snapshot of the backing store.

15. The system of claim 12, wherein the snapshot-creating module is programmed to provide read access to the snapshot without first flushing the write to the backing store by:
detecting a subsequent request to read from a block of the snapshot;
determining that the block of the snapshot is associated with the block of the backing store;
satisfying, while the write is stored within the cache, the request to read from the block of the snapshot with the write stored within the cache.

16. The system of claim 11, wherein the snapshot-creating module is programmed to:
track the write stored within the cache by detecting a request to flush the write from the cache to the backing store;
provide read access to the snapshot of the backing store by flushing, in response to the detection, the write from the cache to the snapshot of the backing store.

17. The system of claim 11, wherein the snapshot-creating module is programmed to track the write while the write is still stored within the cache by:
identifying a cache abstraction layer that manages the cache;
causing the cache abstraction layer to flush the write from the cache to the snapshot of the backing store.

18. The system of claim 17, wherein the snapshot-creating module is programmed to cause the cache abstraction layer to flush the write from the cache to the snapshot of the backing store by:
identifying a log used by the cache abstraction layer to manage writes stored within the cache;
adding a marker to the log that indicates that the write should be flushed from the cache to the snapshot of the backing store.

19. The system of claim 11, wherein:
the write to the backing store is destined for a block of the backing store;
the snapshot-creating module is further programmed to track the write while the write is still stored within the cache by:
maintaining a list of cached blocks of the backing store that includes blocks of the backing store that are cached; and
using the list of cached blocks of the backing store to ensure that the writes stored within the cache and associated with the blocks of the backing store that are cached are included in the snapshot of the backing store.

20. A non-transitory computer-readable medium comprising one or more computer-executable instructions that, when executed by at least one processor of a computing device, cause the computing device to:
identify a cache that implements write-back caching to selectively store at least one write to a backing store;
receive, while the write is stored within the cache, a request to create a snapshot of the backing store, where the write is to be included in the snapshot of the backing store;
create, in response to the request and while the write is still stored within the cache, the snapshot of the backing store by:
determining that the write is stored within the cache;
tracking the write while the write is still stored within the cache and while the snapshot is accessible to ensure that the write is included in the snapshot of the backing store;
provide read access to the snapshot without first flushing the write to the backing store by receiving, while the write is stored within the cache, a request to read from the snapshot;
satisfy the request to read from the snapshot.

* * * * *